United States Patent [19]
Yamada et al.

[11] Patent Number: 5,467,729
[45] Date of Patent: Nov. 21, 1995

[54] BURIED MARKER

[75] Inventors: Yoshio Yamada, Yokohama; Katumi Yamakawa, Ichinomiya, both of Japan

[73] Assignee: Thomas & Betts Corporation, Memphis, Tenn.

[21] Appl. No.: 127,535

[22] Filed: Sep. 28, 1993

[30] Foreign Application Priority Data

Oct. 2, 1992 [JP] Japan ................................ 4-68944

[51] Int. Cl.⁶ ................................................. G01D 21/00
[52] U.S. Cl. ................................................. 116/209; 33/1 H
[58] Field of Search ........................ 33/529, 1 H, 1 CC; 116/209

[56] References Cited

U.S. PATENT DOCUMENTS 3,523,515   8/1970   Brown ................................ 116/209
3,927,637  12/1975   Sammaritano ................... 116/209 X
4,991,536   2/1991   Moshofsky ........................ 116/209
5,506,454   2/1991   Turner .............................. 116/209

Primary Examiner—Alvin Wirthlin
Attorney, Agent, or Firm—Robert M. Rodrick

[57] ABSTRACT

Information of the type, number, burying depth and direction of a pipe or other objects buried in the ground is identified on the ground surface. There is provided a buried marker comprising an identifying plate having indicia thereon and an interconnect band for interconnecting the identifying plate to the object buried in the ground. The position where the pipe or other object is buried is thus easily identified.

9 Claims, 6 Drawing Sheets

BURIED MARKER

FIELD OF THE INVENTION

The present invention relates to a marker for identifying the type, number, burying depth, direction, and the like of a pipe or the like buried in the ground.

BACKGROUND OF THE INVENTION

When construction improvements such as repairs or extensions are to be performed after a pipe or the like is buried, the ground must be dug up. At this time, the identifying block placed above the pipe is moved or temporarily removed. After the construction is completed, the block is restored to the former position. In this case, according to the conventional marker, the block is often placed at a wrong position, left behind, or lost. If the block is not placed at the correct position, a buried pipe or the like may be cut in another construction.

SUMMARY OF THE INVENTION

According to the present application, in order to solve the above problems, there is provided a buried marker comprising identifying means for identifying a type, number, burying depth, and the like of a pipe or wires buried in the ground, and interconnect means for interconnecting the identifying means to the pipe or wires buried in the ground, so that a position of the buried pipe or the like can be properly identified.

In the marker of the present device, the identifying means and a pipe or the like are directly connected to each other through the interconnect means so that information about the pipe or the like can be properly recognized.

According to the buried marker of the present device, since a pipe or the like buried in the ground and the identifying means displaying the type, number, burying depth, and the like of wires or the like are directly connected to each other through the interconnect means, the position where the pipe or the like is buried can be reliably recognized, thereby greatly facilitating a search for the pipe or the like, and preventing accidents, e.g., cutting of the pipe or the like upon erroneous recognition of the position of the buried pipe or the like.

DETAILED DESCRIPTION OF PREFERRED EMBODIMENTS

Figure 1:
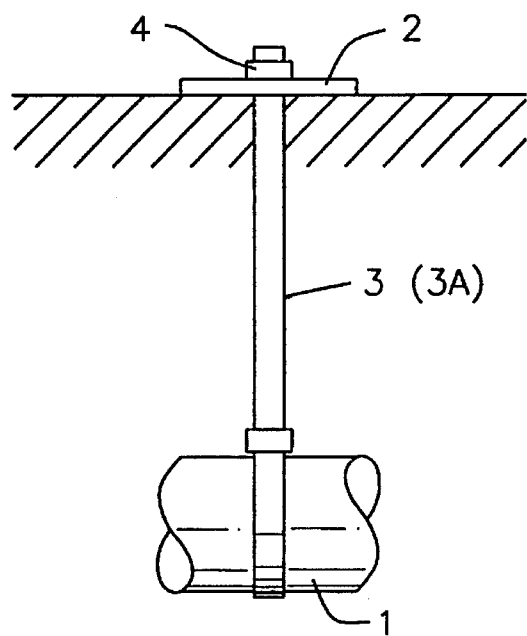
FIG. 1 is a front view showing an application of a buried marker according to the present device.
Figure 2:
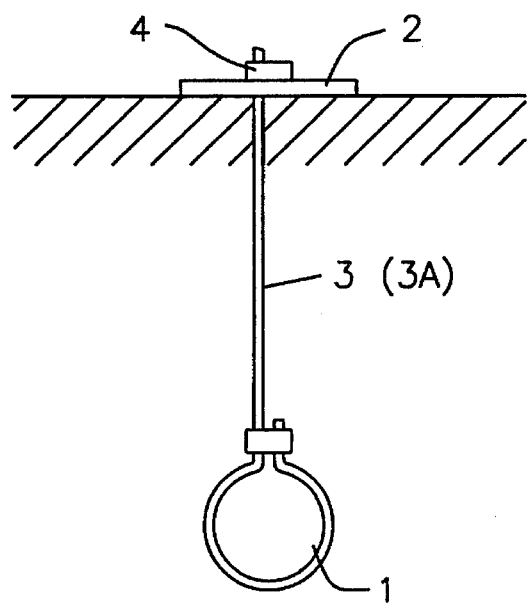
FIG. 2 is a side view showing the application in FIG. 1.

FIGS. 1 and 2 show an application of a buried marker according to the present device. Referring to FIGS. 1 and 2, reference numeral 1 denotes a pipe buried in the ground. In the pipe 1, a predetermined number of wires of a predetermined type, e.g., power cables, optical fibers, or general communication cables, are arranged. Note that the present device may be applied to a case wherein wires or the like are directly buried in the ground.

Reference numeral 2 denotes an identifying means for displaying information, e.g., the type, number, burying depth of wires arranged in the pipe. This embodiment exemplifies an identifying plate having such information written on its surface. This identifying plate is installed on a ground surface above the buried pipe or the like.

Reference numeral 3 denotes an interconnect means for interconnecting such an identifying means to the pipe or the like buried in the ground. In the embodiment, the interconnect means is constituted by a band 3A having one end portion wound around the pipe or the like and the other end portion fixed to the identifying means (identifying plate), and a locking head 4 for locking the other end portion of the band to the identifying plate while one end of the band, which is wound around the pipe or the like, is fixed. The locking head will be described in detail later.

Figure 3:
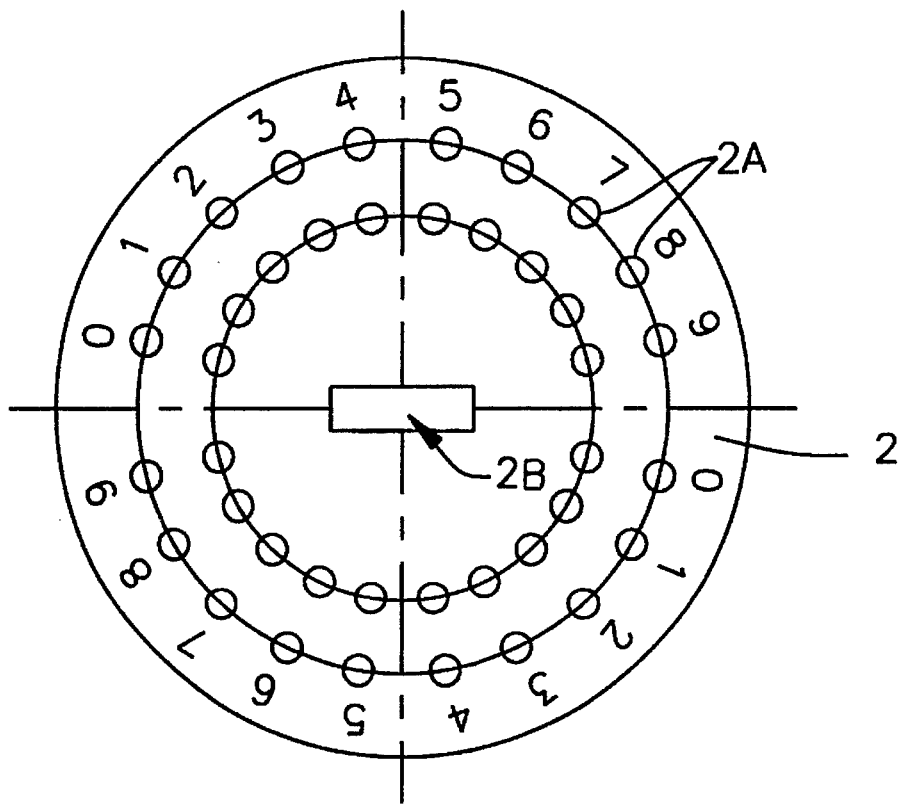
FIG. 3 is a plan view showing the first embodiment of an identifying plate of the buried marker according to the present device.
Figure 4:
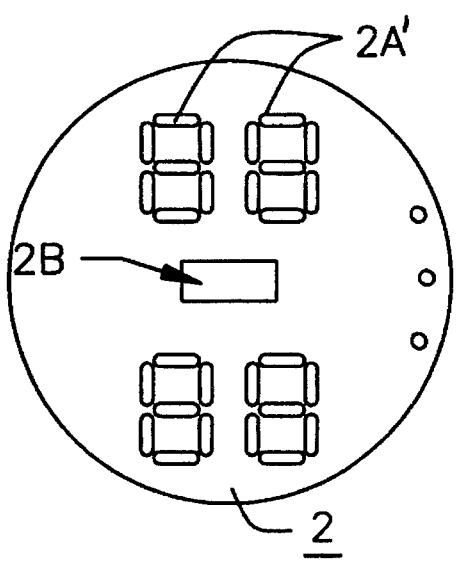
FIG. 4 is a plan view showing the second embodiment of the identifying plate of the buried marker according to the present device.

FIGS. 3 and 4 show the details of identifying plates. The identifying plate shown in FIG. 3 has a disk-like shape. A plurality of dot-like grooves (indentations) 2A and necessary character displays are formed on the surface of the identifying plate. In the embodiment shown in FIG. 3, a set of grooves (indentations) for indicating the burying depth of a pipe or the like, and a set of grooves (indentations) for indicating the number of wires or the like are arranged, and grooves corresponding to a predetermined burying depth and a predetermined number of wires are punched through or painted. The type of wire can be identified by the color of an identifying plate or the color of a paint coated on a groove.

FIG. 4 shows another embodiment of the identifying plate. On the surface of the plate, a combination of character displays indicating the types of cables and dot-like grooves (indentations) and two pairs of grooves (indentations) 2A', each constituting the number "8", are formed. One pair of grooves 2A' are used to display the burying depth of a pipe or the like. The other pair of grooves 2A' are used to display the number of wires. The number "8" is constituted by seven segments. By punching or painting required segments, an arbitrary number can be drawn.

Note that either identifying plate has a through hole 2B formed in its center so as to allow a band to pass therethrough. The band passing through such a through hole is fixed to the identifying plate with a locking head.

Figure 5:
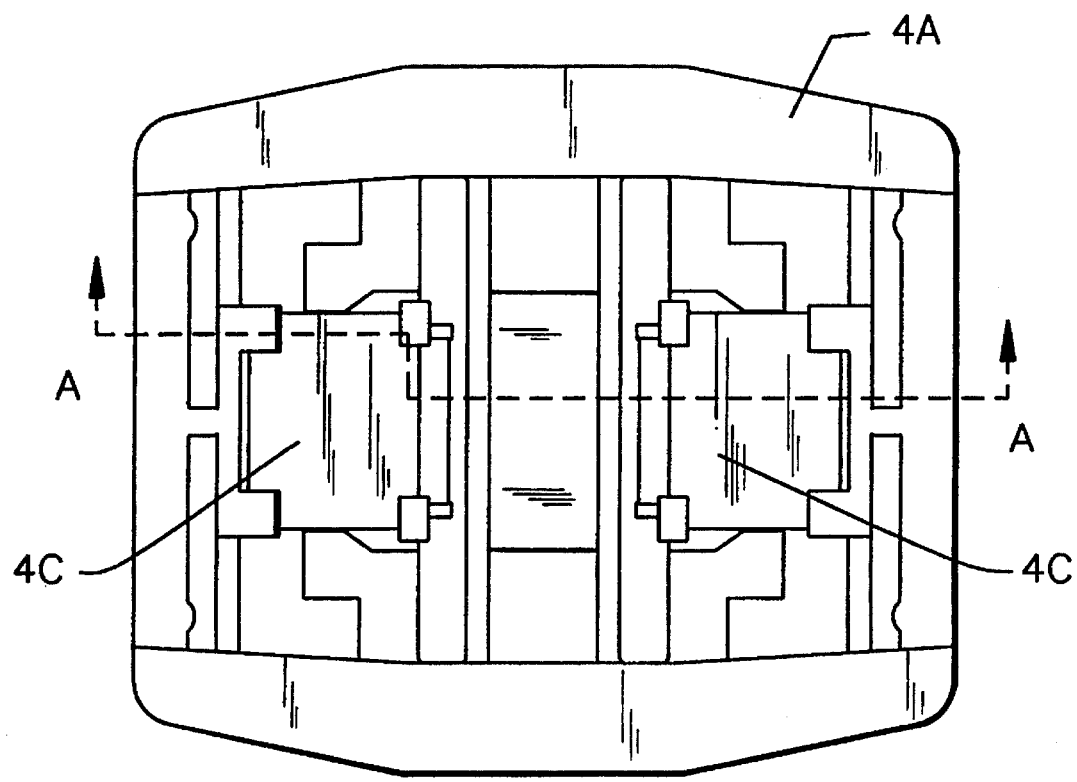
FIG. 5 is a plan view showing an application of a locking head of the buried marker according to the present device.
Figure 6:
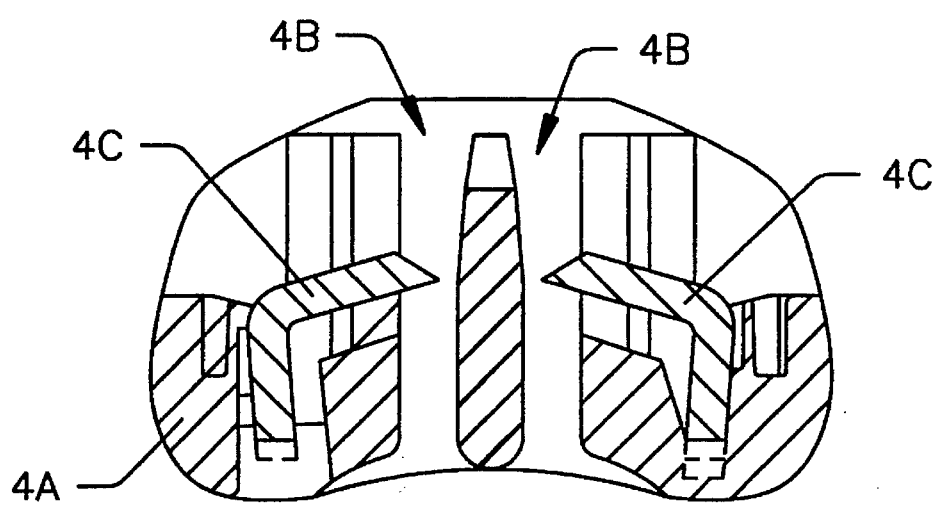
FIG. 6 is a sectional view taken along a line A—A of the locking head in FIG. 5.

FIGS. 5 and 6 show the details of the locking head 4. The locking head is designed such that a pair of band insertion holes 4B are formed in a plastic housing 4A, and a pair of bent metal pawls 4C, which oppose each other, are formed in the housing to face the insertion holes (see FIG. 5). A band is inserted in the locking head from below the insertion holes shown in FIG. 5. When the band is inserted, the pawls are bent outward. The band inserted in the insertion holes are fixed with the elasticity of the pawls.

Note that in the embodiment shown in FIG. 1, such locking heads are used at the two end portions of the band. One locking head is used to fix the band wound around the pipe, and the other locking head is used to fix the band extending through the identifying plate placed on the ground surface.

Figure 7:
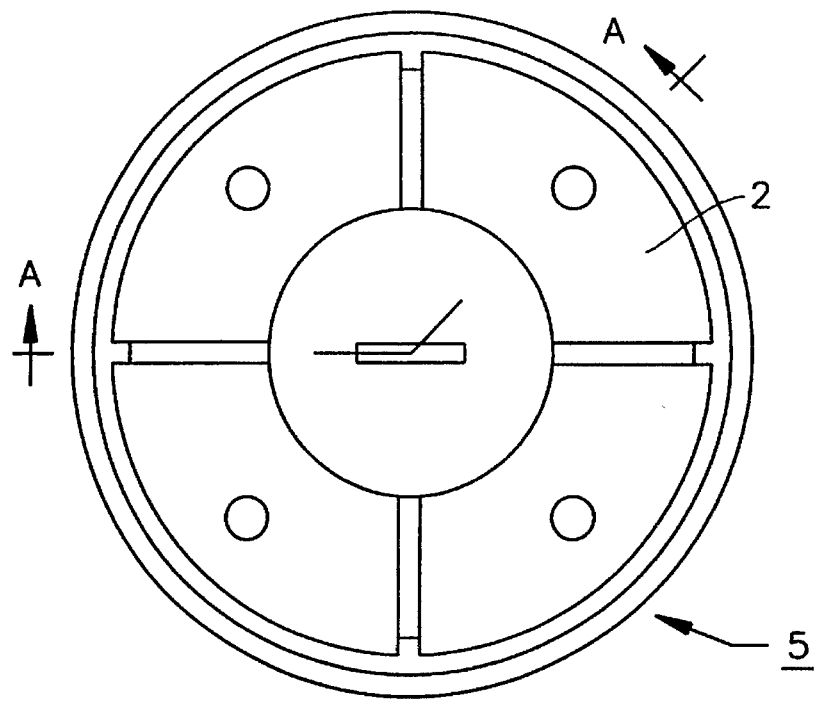
FIG. 7 is a plan view of a spacer.
Figure 8:
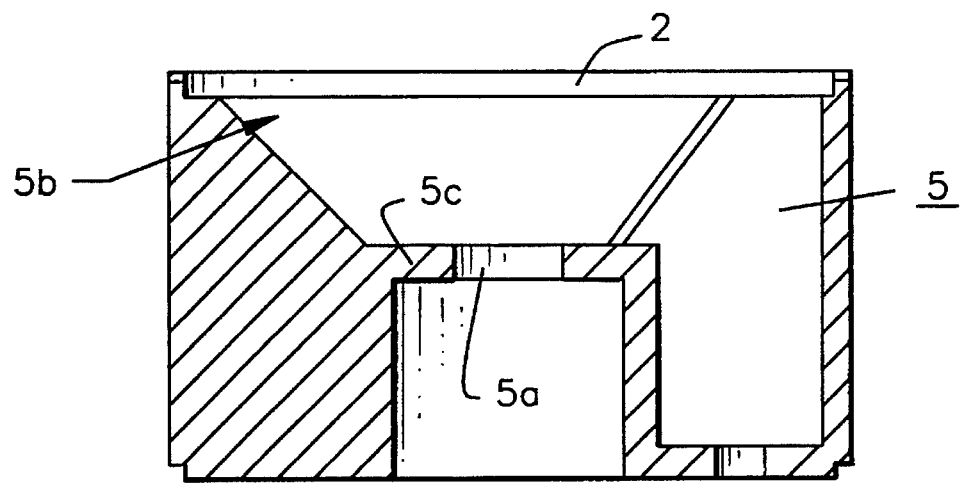
FIG. 8 is a longitudinal sectional view taken along a line A—A of the spacer in FIG. 7.

In the above-described embodiment, the identifying plate is directly placed on the ground surface. The plate may be placed on the ground surface through a spacer. FIGS. 7 and 8 show the details of a spacer for this purpose. FIGS. 9 to 12 show applications of the spacer.

The spacer has a cylindrical (in the embodiment shown in FIGS. 7 and 8) or columnar main body 5d. An opening 5b in which the identifying plate is placed is formed in the main body. In addition, a recess portion 5c is formed in the bottom of the main body. A through hole 5a for allowing the band to extend therethrough is formed in the recess portion.

Figure 9:
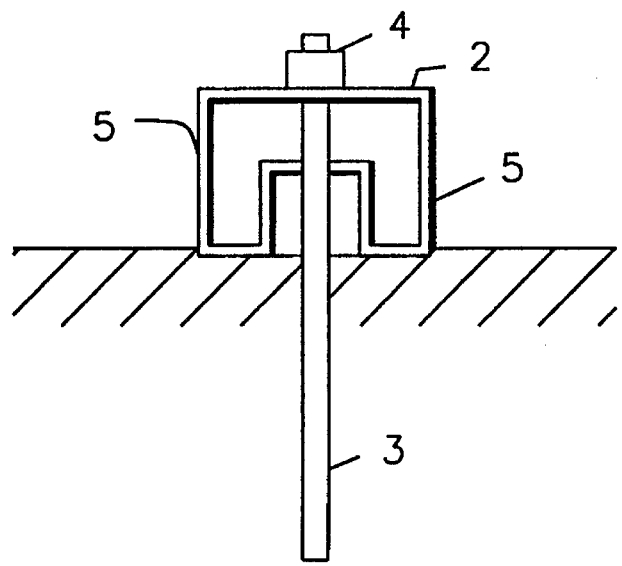
FIG. 9 is a longitudinal sectional view showing an application of the spacer.

In the application shown in FIG. 9, the identifying plate is mounted on the spacer placed on the ground surface so as to be fixed. In this case, since the identifying plate can be placed at a level higher than the ground surface, it can be more easily recognized visually.

Figure 10:
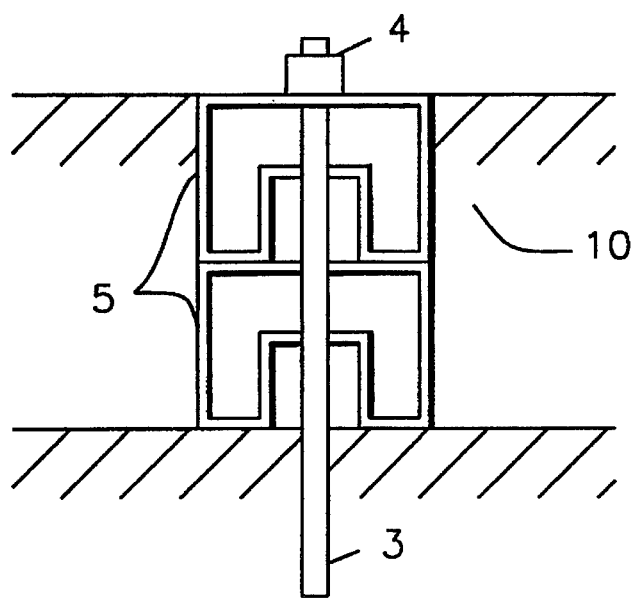
FIG. 10 is a longitudinal sectional view showing another application of the spacer.

In the application shown in FIG. 10, two spacers are stacked on each other, and the identifying plate is mounted on the upper spacer. Referring to FIG. 10, reference numeral 10 denotes an asphalt portion.

Figure 11:
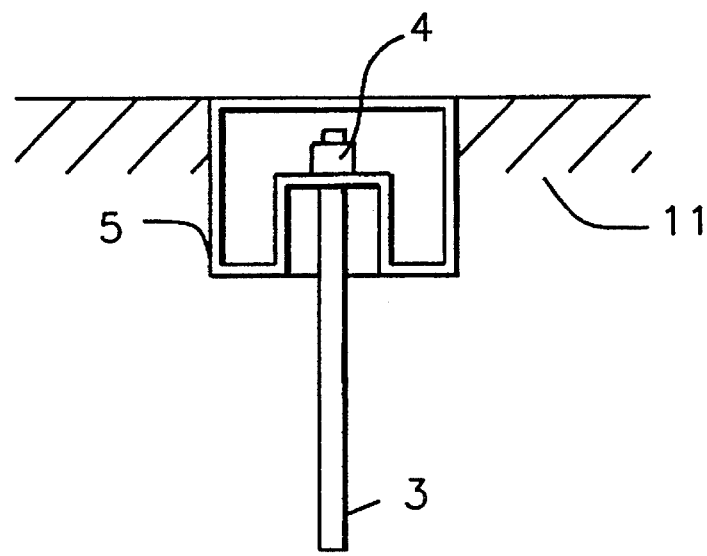
FIG. 11 is a longitudinal sectional view showing still another application of the spacer.

In the application shown in FIG. 11, the spacer is buried in a concrete path 11, and the identifying spacer is mounted in the buried spacer. In this case, the band 3 is fixed at the recess portion 5c of the spacer main body with the locking head 4.

Figure 12:
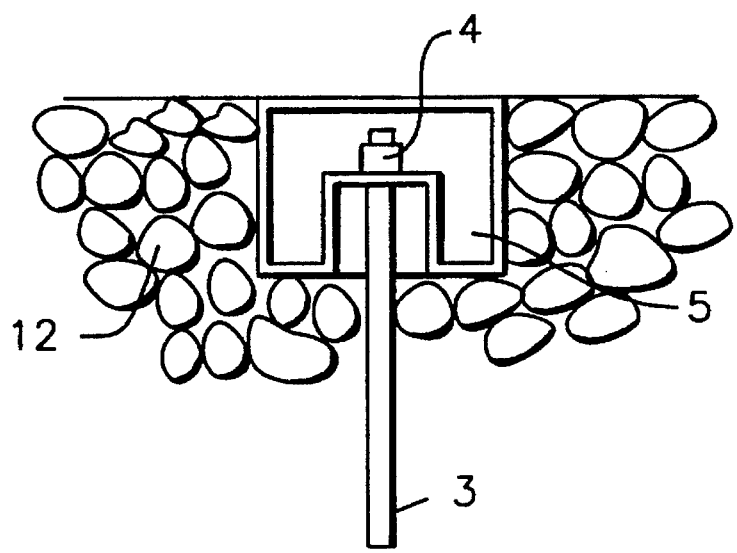
FIG. 12 is a longitudinal sectional view showing still another application of the spacer.

In the application shown in FIG. 12, the spacer is buried in a gravel path 12, and the identifying spacer is mounted in the buried spacer. In this case, the band 3 is also fixed at the recess portion 5c of the spacer main body with the locking head 4.

As shown in FIGS. 10 to 12, even if the ground surface is covered with, e.g., an asphalt path, a concrete path, or a gravel path, the buried marker according to the present application can be used through the spacer.

What is claimed is:

1. A buried marker comprising:

an identifying plate comprising indicia thereon for identifying a type, the number, a burying depth of an object buried in the ground;

an interconnect member for interconnecting said identifying plate and the object buried in the ground, and a first lock affixing said interconnect member to said identifying plate and a second lock affixing said interconnect member to said buried object, said first lock and said second lock both being of the type comprising a plastic locking head having an insertion hole therein to receive an end of said interconnect member and a metal pawl supported therein to engage a respective end of said interconnect member.

2. A buried marker according to claim 1, wherein the indicia of said identifying plate comprises plural sets of slots which are markable.

3. A buried marker according to claim 2, wherein said interconnect member comprises a band for being affixed to said buried object at one end portion thereof and fixing on said identifying plate at the other end portion thereof.

4. A buried marker according to claim 3, wherein said identifying plate is placed on a spacer.

5. A buried marker according to claim 4, wherein said spacer has a cylindrical main body, and said main body has a through hole for allowing said interconnect band to extend therethrough and an opening in which said identifying plate is placed.

6. A buried marker according to claim 5, wherein said spacer has a recess portion in the bottom thereof and said through hole is formed in said recess portion.

7. A buried marker comprising:

an identifying plate comprising indicia thereon for providing information regarding an object buried under ground;

an interconnect strap having an extent extending between said identifying plate and said buried object;

a first locking element affixing said interconnect strap with said buried object;

a spacer comprising a main body having a recess therein and an intermediate wall within said recess, said body having a surface spaced from said recessed wall receiving said identifying plate thereon, said recessed wall having a hole therethrough for receiving said interconnect strap; and a second locking element affixing said interconnect strap with said spacer.

8. A buried marker according to claim 7, wherein said second locking element is disposed within said recess between said identifying plate and said recessed wall.

9. A buried marker according to claim 7, wherein said identifying plate has a hole therethrough in substantial alignment with said hole through said recessed wall, said second locking member being disposed exteriorly of said identifying plate and affixing said identifying plate to said interconnect strap.

* * * * *